United States Patent
Henn et al.

(10) Patent No.: US 9,444,541 B2
(45) Date of Patent: Sep. 13, 2016

(54) PIPE INSPECTION SYSTEM WITH WIRELESS DATA TRANSMISSION

(71) Applicant: iPEK International GmbH, Sulzberg (DE)

(72) Inventors: Peter Henn, Krugzell (DE); Fabian Zahnd, Kempten (DE)

(73) Assignee: iPEK International GmbH, Sulzberg (DE)

( * ) Notice: Subject to any disclaimer, the term of this patent is extended or adjusted under 35 U.S.C. 154(b) by 194 days.

(21) Appl. No.: 14/024,208

(22) Filed: Sep. 11, 2013

(65) Prior Publication Data

US 2014/0073238 A1 Mar. 13, 2014

(30) Foreign Application Priority Data

Sep. 11, 2012 (DE) .................. 10 2012 108 499

(51) Int. Cl.
| | |
|---|---|
| *H04B 3/36* | (2006.01) |
| *H04B 7/14* | (2006.01) |
| *H04B 7/145* | (2006.01) |
| *G06T 1/00* | (2006.01) |
| *H04Q 9/00* | (2006.01) |

(52) U.S. Cl.
CPC .............. *H04B 7/145* (2013.01); *G06T 1/0007* (2013.01); *H04Q 9/00* (2013.01); *H04Q 2209/40* (2013.01); *H04Q 2209/50* (2013.01)

(58) Field of Classification Search
USPC ............ 455/24, 41.2, 82, 115.1, 115.2, 7–9, 455/11.1, 12.1, 13.1, 13.2, 14–17; 702/56–63, 121–123, 171, 183–190
See application file for complete search history.

(56) References Cited

U.S. PATENT DOCUMENTS

| | | | | |
|---|---|---|---|---|
| 5,098,023 | A * | 3/1992 | Burke | 239/273 |
| 7,621,286 | B2 * | 11/2009 | Frei | A47L 15/16 134/129 |
| 8,264,226 | B1 * | 9/2012 | Olsson | G01V 3/15 324/326 |
| 8,521,453 | B1 * | 8/2013 | Silverman et al. | 702/56 |
| 8,547,428 | B1 * | 10/2013 | Olsson | G03B 37/005 348/374 |
| 2003/0229421 | A1 * | 12/2003 | Chmura et al. | 700/245 |
| 2004/0016540 | A1 * | 1/2004 | Jarchau | E21B 41/0078 166/222 |
| 2004/0231723 | A1 * | 11/2004 | Harrington et al. | 137/355.2 |
| 2007/0109404 | A1 * | 5/2007 | Lortie | 348/85 |

(Continued)

FOREIGN PATENT DOCUMENTS

| | | |
|---|---|---|
| DE | 10255221 A1 | 6/2004 |
| DE | 202010012291 U1 | 12/2010 |

OTHER PUBLICATIONS

Roboternetz Forum accessed from http://www.roboternetz.de/community/threads/47620-Repeater-fur-433-und-868-Mhz-(RN-)Funk-und-2-4-Ghz-Kamera on Apr. 21, 2016.

(Continued)

*Primary Examiner* — Dominic Rego
(74) *Attorney, Agent, or Firm* — Myers Wolin, LLC

(57) ABSTRACT

An inspection system is provided, in particular, a pipe inspection system for inspection and/or cleaning of pipes, in particular, sewage pipes, whereby the inspection system comprises an inspection unit and a control unit, whereby the inspection system comprises a transmission-/reception means for wireless transmission of control and/or measurement data between the inspection unit and the control unit. Further, an inspection unit and a transmission-/reception unit suitable for this are provided.

6 Claims, 3 Drawing Sheets

(56) References Cited

U.S. PATENT DOCUMENTS

| | | | |
|---|---|---|---|
| 2007/0177880 A1* | 8/2007 | Karasikov et al. | 398/170 |
| 2008/0158005 A1* | 7/2008 | Santoso et al. | 340/854.4 |
| 2009/0085582 A1* | 4/2009 | Sinha | 324/644 |
| 2009/0320891 A1* | 12/2009 | Liedtke | F23D 11/386 134/169 R |
| 2011/0089695 A1* | 4/2011 | Krouse et al. | 290/52 |
| 2011/0109437 A1* | 5/2011 | Olsson | 340/8.1 |
| 2011/0196534 A1* | 8/2011 | Ekes et al. | 700/259 |
| 2012/0125333 A1* | 5/2012 | Bedford et al. | 128/203.25 |
| 2012/0199454 A1* | 8/2012 | Guillot et al. | 200/302.1 |
| 2013/0043681 A1* | 2/2013 | Rivera | 290/52 |
| 2013/0098643 A1* | 4/2013 | McLoughlin et al. | 169/46 |
| 2013/0314529 A1* | 11/2013 | Hoffman | H04N 7/183 348/82 |
| 2014/0020166 A1* | 1/2014 | Metcalf et al. | 4/301 |
| 2014/0210989 A1* | 7/2014 | Olsson | H04N 5/232 348/84 |

OTHER PUBLICATIONS wiki.freifun.net: WLAN-Antennen accessed from http://wiki.freifunk.net/index.php?title=WLAN-Antennen&oldid=12349 on Apr. 22, 2016.

German search report, dated Apr. 3, 2013, for German application 10 2013 101 624.3.

* cited by examiner

PIPE INSPECTION SYSTEM WITH WIRELESS DATA TRANSMISSION

CROSS-REFERENCE TO RELATED APPLICATIONS

This application claims priority to German Application No. 10 2012 108 499.8, filed on Sep. 11, 2012, the contents of which are hereby incorporated by reference.

FIELD OF THE INVENTION

The invention relates to an inspection system, in particular, a sewer inspection system for inspection and/or cleaning of pipes, in particular, sewage pipes, as well as an inspection unit for the inspection system according to the invention.

BACKGROUND

For carrying out pipe or sewer inspections, respectively, it is known to use so-called sewage inspection systems which may be introduced into a pipe or sewage pipe, respectively, and which may be moved within the sewage pipe. For cleaning of sewage pipes it is known to use cleaning devices, as for example, high pressure rinsing devices. The sewage pipe inspection systems as well as the cleaning devices may comprise sensors by means of which various measurement data may be collected during the inspection or during the cleaning, respectively.

The measurement data acquired has to be transmitted to a control means outside of the pipe system where it is evaluated and, if needed, further processed. For this, it is known to connect the sewage pipe inspection systems or cleaning devices, respectively, to the control means via a wire connection.

However, with respect to the data transmission via wire connections, the limited transmission length due to the limited length of the cable connection is disadvantageous. With this, a sewage pipe inspection system and a cleaning device, respectively, may only be introduced into a pipe or the sewage pipe, respectively, up to a certain length. A further disadvantage is that the cable connections in a harsh environment during pipe inspections or pipe cleaning, respectively, are subject to high wearing and can easily be damaged, potentially requiring a partial or complete replacement of the cable connections. Therefore, it is necessary to provide the cables or cable connections, respectively, with a stable and substantially wear-free coating which in turn entails a high additional weight of the cable.

A further substantial disadvantage is that the cable during a sewage pipe inspection or during a sewage pipe cleaning preferably needs to be de-coiled from or recoiled on to a cable drum. The de- or recoiling, respectively, of the cable specifically is problematic, if the cable at the same time has to be de- or recoiled with a high pressure pipe, which for example is a case with a sewage pipe cleaning device, which has to be supplied with rinsing water via a high pressure hose. This leads to increased setup times or working times, respectively, of the sewage pipe inspection or sewage pipe cleaning, respectively.

During the use of the sewage pipe inspection systems or sewage pipe cleaning systems, respectively, in explosion protected areas, moreover, it needs to be ensured that the cables are not damaged or cannot be damaged during the use, in particular, then when not only measurement data is transmitted via the cable to the control means, but rather also the inspection system has to be supplied with energy.

For performing sewage pipe cleaning it is known to at first clean or rinse, respectively, the pipe with a cleaning device, and after the cleaning, to inspect the sewage pipe with a sewage pipe inspection system to, on the one hand, check the success of the cleaning, and on the other hand, to provide a documentation of the cleaning for the ordering customer. With respect to this procedure, it is, however, disadvantageous that the cleaning of the sewage pipe, at first, has to be carried out "blind". Badly or insufficiently cleaned sewage pipe sections can only be discovered during the subsequent sewage pipe inspection, which results therein that the pipe at least partially needs to be cleaned or rinsed, respectively, again. Due to the fact that the cleaning and the inspection need to be carried out separately, a complete sewage pipe cleaning is relatively time consuming and cost-intensive.

Therefore, it is an object of the present invention, to at least partially avoid the disadvantages known from prior art, and to provide an inspection system, in particular, a sewage pipe inspection system as well as an inspection unit for an inspection system, by means of which on the one hand, a reliable and simple data transmission between the inspection unit and the control means, and on the other hand, a more efficient sewage pipe inspection and sewage pipe cleaning are enabled.

SUMMARY

According to the invention this problem is solved by an inspection system, in particular, by a sewage pipe inspection system for inspection and/or cleaning of pipes, in particular, sewage pipes, and by an inspection unit for an inspection system according to the independent claims. Preferred embodiments of the invention are defined in the respective dependent claims.

Thus, an inspection system, in particular, a sewer inspection system, for inspection and/or cleaning of pipes, in particular, sewage pipes, is provided, whereby the inspection system comprises an inspection unit and a control means, whereby the inspection system further comprises a transmission-/reception means for wireless transmission of control and/or measurement data between the inspection unit and the control means.

Thus, cable connections, in particular, for data transmission between the inspection unit and the control means as well as for transmission of control data from the control means to the inspection unit can be omitted completely. The setup times of a sewage pipe inspection, moreover, can be substantially reduced, because it can be dispensed with the de- and recoiling of the cable connections. Because the cable connections can be completely dispensed with, the inspection system according to the invention also is suitable for the use in explosion protected areas, because the risk of explosion due to damaged cable connections is completely avoided.

The transmission-/reception means may comprise a first transmission-/reception unit and a second transmission-/reception unit, whereby the first transmission-/reception unit is assigned to the inspection unit, whereby the second transmission-/reception unit is assigned to the control means, and whereby for transmission of control and/or measurement data between the two transmission-/reception units, a wireless communication connection may be established.

In a preferred embodiment of the invention, the transmission-/reception means comprises at least a third transmission-/reception means, which is operatively arranged between the first transmission-/reception means and the second transmission-/reception means, and is configured as repeater for range increase for the wireless communication connection between the first transmission-/reception unit and the second transmission-/reception unit.

Thereby, for the first time, it is possible to inspect arbitrarily long pipes and at the same time to transmit measurement data to the control means.

The transmission-/reception units may comprise an antenna system respectively with at least one transmitting antenna and at least one receiving antenna. The wireless communication connection may comprise a WLAN connection (wireless LAN). The provision of a WLAN communication connection has the advantage that no separate official special permit is necessary for sewage pipe inspection systems or sewage pipe cleaning systems, respectively.

In a preferred embodiment of the invention, the inspection unit of the inspection system according to the invention may be configured as high pressure rinsing device. A rinsing head with a plurality of rinsing nozzles directed substantially backwards may be arranged at a front end of the high pressure rinsing device. Behind the rinsing head, the first transmission-/reception unit may be arranged such that the transmission and/or receiving antennas of the antenna system of the transmission-/reception unit are substantially directed backwards. The arrangement of the transmission-/reception unit behind the rinsing head has the advantage that the influence of the rinsing water leaving the rinsing head on the wireless communication connection is minimized.

Further, an inspection unit for the inspection system according to the invention, in particular, a sewage pipe inspection system for inspection and/or cleaning of pipes, in particular sewage pipes, is provided, which has a first rinsing hose, whereby a front end of the first rinsing hose may be coupled to a rinsing head having a plurality of rinsing nozzles being substantially directed backwards, and whereby a rear end of the first rinsing hose is coupled to a transmission-/reception unit for wireless transmission of control and/or measurement data between the inspection unit and a control unit.

The transmission-/reception unit may be coupled to a second rinsing hose, whereby a conduit is provided within the transmission-/reception unit, via which the first rinsing hose is connected to the second rinsing hose. The conduit preferably has substantially the same diameter as the first and/or second rinsing hoses.

In the transmission-/rinsing unit, a device for transformation of kinematic energy of the rinsing water into electrical energy may be arranged, whereby the device may have at least one water turbine and at least one generator. Thereby, the inspection unit may be advantageously supplied with electrical energy without a power cable having to be provided via which electrical energy is supplied to the inspection unit from the outside. The electrical energy thus generated may be used to supply the transmission-/reception unit with energy such that for data transmission as well as for power supply, a cable connection may be omitted.

An accumulator may be arranged in the transmission-/reception unit which is coupled to the generator. This has the advantage that, on the one hand, the accumulator may be charged by the generator, and, on the other hand, also electrical energy may be provided when the water turbine and the generator, respectively, are not operated.

Advantageously, a transmission-/reception module of the transmission-/reception unit is coupled to the generator and/or to the accumulator for power supply of the transmission-/reception module.

An image acquisition means may be arranged at the rinsing head, and the first rinsing hose which connects the rinsing head to the transmission-/reception unit may comprise electrical cables which connect the image acquisition means to the generator and/or to the accumulator for power supply of the image acquisition means, and which connects the image acquisition means to the transmission-/reception module to transmit the images from the image acquisition means to the transmission-/reception module and/or control signals from the transmission-/reception module to the image acquisition means.

The electrical cables may be integrated into the jacket of the first rinsing hose, whereby terminals of the electrical cables are provided at the ends of the first rinsing hose, and whereby counter contacts corresponding to the terminals are provided at the rinsing head and at the transmission-/reception unit.

The transmission-/reception unit may comprise an antenna system with at least one transmitting antenna and at least one receiving antenna, whereby the antennas of the antenna system are essentially directed backwards. The antenna system may comprise a single antenna, which is configured as a transmitting antenna and receiving antenna.

Further, a transmission-/reception unit is provided by the invention, in particular, for use in a sewage pipe inspection system according to the invention, for wireless transmission of control and/or measurement data between an inspection unit of the sewage pipe inspection system and a control means of the sewage pipe inspection system, whereby the transmission-/reception unit may be coupled to a first rinsing hose and to a second rinsing hose, whereby a conduit is provided in the transmission-/reception unit, via which the first rinsing hose is connected to the second rinsing hose.

A device for transformation of kinematic energy of rinsing water into electrical energy may be arranged in the transmission-/reception unit, whereby the device comprises at least one water turbine and at least one generator.

An accumulator may be arranged in the transmission-/reception unit, which is coupled to the generator.

A transmission-/reception module of the transmission-/reception unit may be coupled to the generator and/or to the accumulator for power supply of the transmission-/reception module.

The transmission-/reception unit may comprise an antenna system with at least one transmitting antenna and at least one receiving antenna.

By means of the transmission-/reception unit according to the invention, two rinsing hoses may be coupled to each other in a simple manner, whereby electrical energy for the operation of the transmission-/reception unit may be generated from the water flowing through the transmission-/reception unit. By using an arbitrary number of transmission-/reception units according to the invention, it is possible to produce a rinsing hose of an arbitrary length at the front end of which the rinsing head is arranged, and by means of which in principle, pipes or sewage pipes, respectively, having an arbitrary length may be rinsed or cleaned, respectively.

BRIEF DESCRIPTION OF THE DRAWINGS

Further details and features of the invention as well as concrete, in particular, preferred embodiments of the invention become clear from the following description in connection with the drawings.

DETAILED DESCRIPTION

Figure 1:
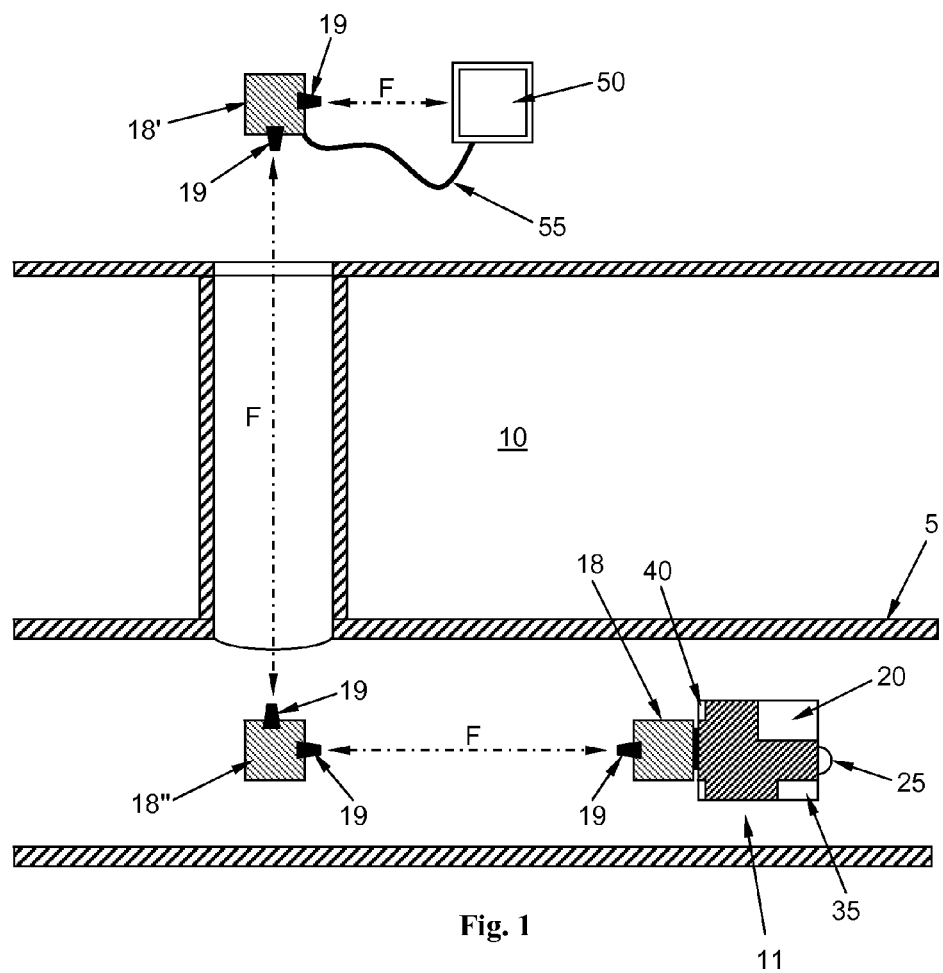
FIG. 1 shows an inspection system according to the invention with an inspection unit and a control means, which are coupled to each other via a wireless communication connection.

FIG. 1 shows an inspection system 10 according to the invention comprising an inspection unit 11 and a control unit 50, which may be or are coupled via a wireless communication connection F. Here, the inspection unit 11 is arranged within a pipe 5 of a pipe system, while the control means 50 is arranged outside of the pipe system.

Here, the inspection unit 11 has an image acquisition means 20, for example, a video camera, by means of which images or videos may be taken during the inspection. For lighting the pipe, at the front end of the inspection unit 11 a light source, for example, an LED 25, is provided. Further, measuring elements 35, for example, infrared temperature sensors, pressure sensors, humidity sensors or the like may be provided at the inspection unit 11. The measurement data detected by the measuring elements 35 and the images and videos generated by the image acquisition means 20, respectively, are transmitted via the wireless communication connection F to the control means 50. Vice versa, the control means 50 may transmit control signals or control data, respectively, via the wireless communication connection F to the inspection unit 11 in order to control the inspection unit 11 and the electrical modules arranged thereon, respectively.

For wireless transmission of measurement data and control data, respectively, between the control means 50 and the inspection unit 11, and for wireless transmission of measurement data and image data between the inspection unit 11 and the control means 50, respectively, two transmission-/reception units are provided, whereby a first transmission-/reception unit 18 is assigned to the inspection unit 11 and is arranged at the inspection unit 11, respectively, and whereby a second transmission-/reception unit 18' is assigned to the control means 50 and is coupled to the control means 50, respectively. Both transmission-/reception units 18, 18' comprise an antenna system with a transmitting antenna and a receiving antenna.

The inspection unit 11, moreover, may comprise a device 40 for power generation, whereby the power generated by means of the device 40 may be supplied to the inspection unit 11 and to the first transmission-/reception unit 18. An example of a device for power generation 40 is further described with reference to FIG. 3.

Further, a third transmission-/reception unit 18" is provided at the example of an inspection system according to the invention, which may be configured as repeater for range increase of the wireless communication connection F. The repeater 18" comprises two antenna modules or antenna systems 19, respectively, having each a transmitting antenna and a receiving antenna, whereby the first antenna system for establishment of a wireless communication connection to the first transmission-/reception unit 18 and the second antenna system for establishment of a wireless communication connection to the second transmission-/reception unit 18' are provided. The repeater 18" may also comprise a device for power generation, as is further described with reference to FIG. 4.

The inspection unit 11 may be arranged together with the first transmission-/reception unit at or on, respectively, an inspection carriage, by means of which the inspection unit may be moved through the pipe.

The control means 50 may also be coupled via a wireless communication connection F to the second transmission-/reception unit 18'. Alternatively, the control means 15 may also be coupled via a cable or data cable 55, respectively, to the second transmission-/reception unit 18'. In a specific embodiment of the invention, the second transmission-/reception unit 18' is part of the control means 50.

Figure 2:
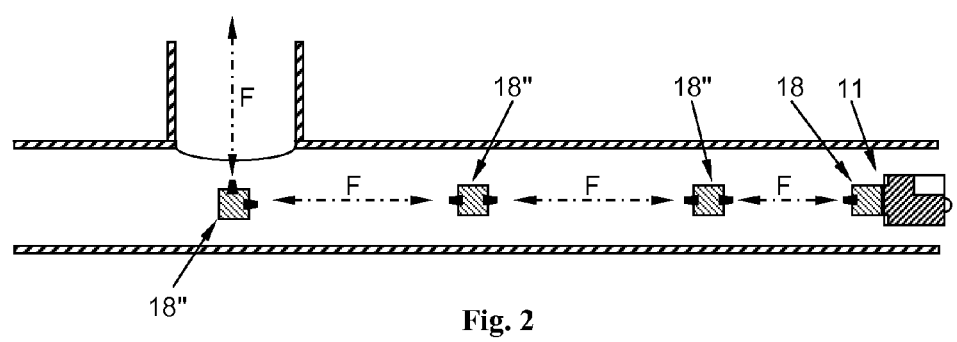
FIG. 2 shows an inspection system according to the invention according to which a number of transmission-/reception units (repeaters) according to the invention are arranged between the control means and the inspection unit, for increasing the range of the wireless communication connection.

FIG. 2 shows an inspection system according to the invention, according to which the range of the wireless communication connection F may be increased by a number of repeaters 18". Between the inspection unit 11 and the first transmission-/reception unit 18, respectively, and the second transmission-/reception unit 18' not shown in FIG. 2, here, three repeaters 18" are arranged, whereby between each two repeaters or between a repeater and the first or the second transmission-/reception unit, respectively, a wireless communication connection F is established. Thereby, it is possible to establish an arbitrarily wide communication connection between the control means 50 and the inspection unit 11 such that an arbitrarily long pipe section may be inspected in a single inspection procedure without having to move the inspection unit 11 out of the pipe.

Each one of the repeaters 18", here, comprises two antenna systems, which respectively have a transmitting antenna and a receiving antenna via which the wireless communication connection to the preceding or to the subsequent repeater 18", respectively, or to the first transmission-/reception unit 18, respectively, or to the second transmission-/reception unit 18' is established. In an embodiment of the invention, it may be sufficient to only provide one antenna system for each repeater 18" depending in the end on the concrete arrangement of the antennas at the repeater.

Figure 3:
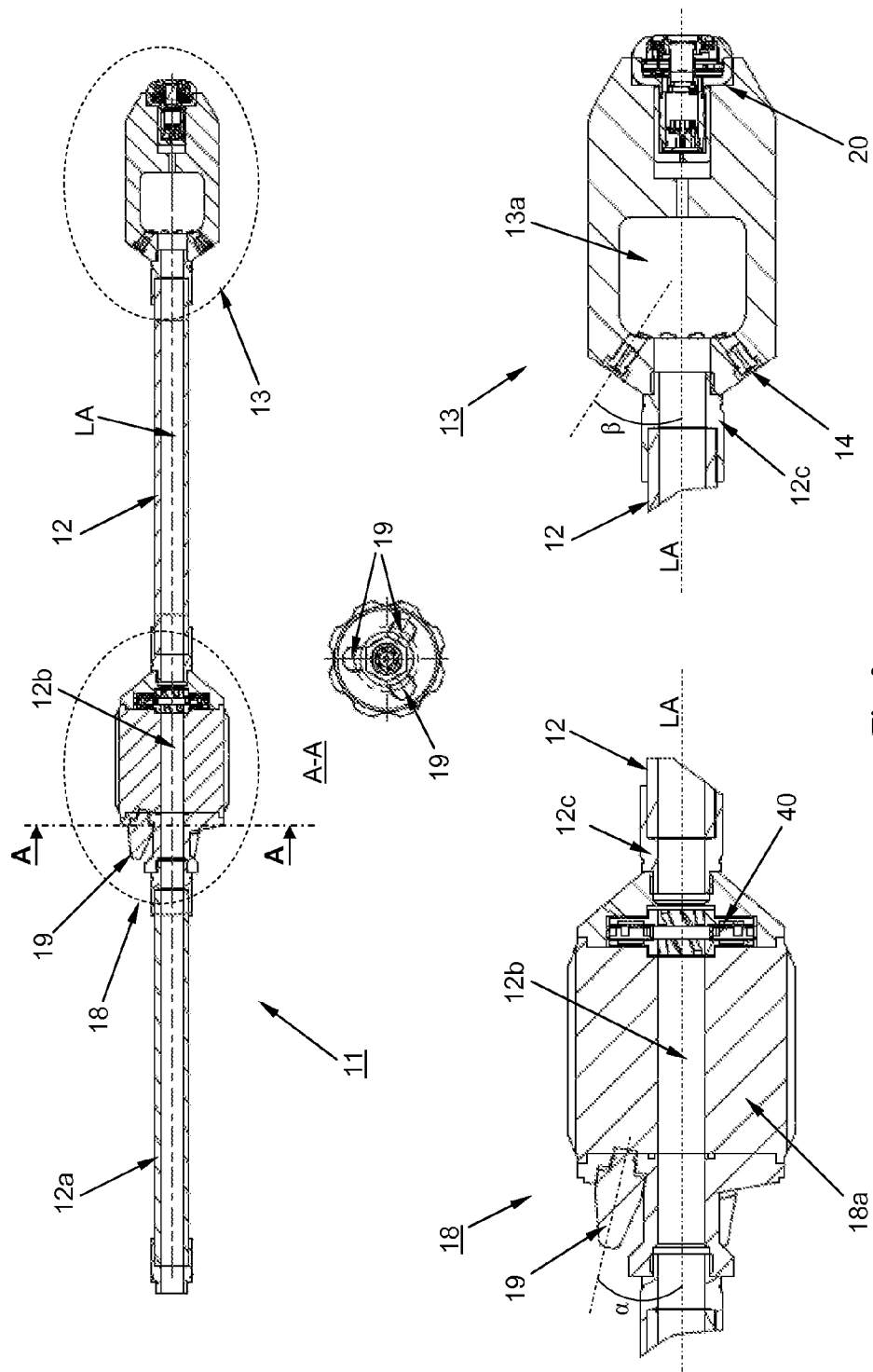
FIG. 3 shows an inspection unit, which is configured as high pressure rinsing means.

FIG. 3 shows an inspection unit 11 according to the invention, which, here, is also configured as high pressure rinsing means with a transmission-/reception means.

The high pressure rinsing means consists substantially of a first rinsing hose 12, a rinsing head 13, and a transmission-/reception unit 18, whereby the rinsing hose 12 couples the transmission-/reception unit 18 to the rinsing head 13. At the other end of the transmission-/reception device 18, a second rinsing hose 12a is coupled thereto, which essentially may have an arbitrary length and may be provided for supply of rinsing water to the high pressure rinsing means.

The transmission-/reception unit 18 and the rinsing head 13 are illustrated in FIG. 3 in an enlarged view.

The transmission-/reception unit 18 at the front end and at the rear end has hose couplings 12c for connecting the first rinsing hose 12 and the second rinsing hose 12a to the transmission-/reception unit. In a preferred embodiment of the invention, hose couplings 12b may be configured as quick-lock couplings.

A conduit 12b is provided in the interior of the transmission-/reception unit 18, which connects the first rinsing hose to the second rinsing hose such that the rinsing water supplied via the second rinsing hose 12a may reach the first rinsing hose 12 via the conduit 12b. The conduit 12b essentially has the same inner diameter as the first rinsing hose 12 and the second rinsing hose 12b, respectively.

The transmission-/reception unit 18 comprises a transmission-/reception module 18a and an antenna system 19, which has a number of transmitting and receiving antennas, respectively. The antennas of the antenna system 19 are arranged at the rear end in the connection area of the second rinsing hose 12a, such that the communication connection established via the antenna system 19 is affected or impaired, respectively, as little as possible by the rinsing water discharged from the rinsing head 13. The antennas of the antenna system 19, here, are arranged in a certain angle α with respect to the longitudinal axis LA of the transmission-/reception unit. The antennas of the antenna system may also be arranged essentially in parallel or perpendicular to the longitudinal axis LA.

Moreover, a device 40 for power generation is provided in the transmission-/reception unit, by means of which kinetic energy of the rinsing water flowing there through may be transformed into electrical energy. In an embodiment of the invention, the device 40 comprises at least a water turbine and at least a generator, whereby the generator preferably is coupled to an accumulator also arranged within the transmission-/reception unit. The transmission-/reception unit and the device 40 arranged therein and the generator of the device 40, respectively, and the antennas of the antenna system 19 are preferably accommodated in a water-tight housing. The transmission-/reception module 18a is connected to the accumulator or the generator, respectively, to be supplied with electrical power. Thereby, the transmission-/reception unit 18 may be supplied with electrical power without an external power supply being necessary for this, and cable connections to the external power supply may be dispensed with.

The rinsing head 13 essentially consists of a rinsing housing, in which a chamber 13a is provided, into which the supplied rinsing water is discharged. Further, the rinsing head 13 has a number of rinsing nozzles 14, which also are connected to the chamber 13a such that rinsing water introduced into the chamber 13a may escape through the rinsing nozzles 14. The rinsing nozzles 14 are arranged in a predetermined angle β with respect to the longitudinal axis LA of the rinsing nozzle 14 such that water being discharged from the rinsing nozzles 14 besides cleaning the pipe also effects the advancing of the rinsing head 13 and the high pressure rinsing means, respectively.

At the front end of the rinsing head 13, an image acquisition means 20 is arranged, which here is configured as video camera. By means of the video camera, the condition of the pipe may be checked simultaneously with the cleaning of the pipe. To monitor the success of the cleaning immediately during the cleaning, only the rinsing head has to be drawn slightly backwards, so that the area of the pipe having been cleaned just before lies within the range of vision of the video camera 20. In particular, the cleaned pipe may be filmed by the video camera 20 during the drawing of the rinsing head 13 out of the pipe such that a pipe inspection subsequent to the pipe cleaning no longer is necessary. In case during the drawing out it is determined that areas of the pipe have not been cleaned as desired, the corresponding part may be cleaned once again, and may be checked again during the further drawing out of the rinsing head again.

To be able to transmit the video data acquired by the video camera via the transmission-/reception unit 18 to the external control unit 50, it is provided to arrange electrical connections in the first rinsing hose 12 and in the jacket of the first rinsing hose 12, respectively, by means of which the video camera 20 is coupled to the transmission-/reception unit 18. On the one hand, video data of the video camera 20 may be transmitted to the transmission-/reception device 18, and on the other hand, the video camera 20 may be supplied with the necessary power. For this, it is advantageous that the first rinsing hose 12 has connection contacts of the electrical connections at its ends, and that counter contacts corresponding to the connection contacts are provided at the rinsing head 13 or at the transmission-/reception unit 18, respectively. The contacts and counter contacts, respectively, may be integrated into the respective hose couplings such that during connection of the rinsing hose 12 to the rinsing head 13 and to the transmission-/reception unit 18, respectively, at the same time, also an electrical connection is established.

Further, in FIG. 3 a cross section along the line A-A is shown. In particular, it may be seen that the transmission-/reception unit 18 may have several antenna systems with transmitting and receiving antennas, respectively. Here, the transmission-/reception unit 18 has three antenna systems 19. Thereby, an optimal communication connection between two transmission-/reception units may be guaranteed in that reflections and directivity of the transmitted and received signals, respectively, may be used.

Figure 4:
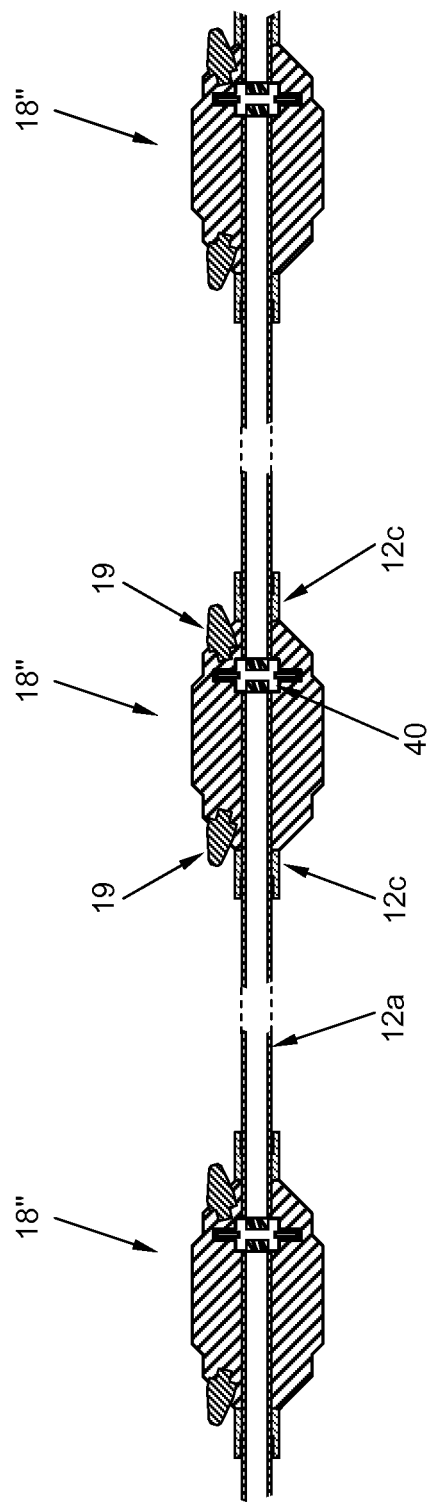
FIG. 4 shows three transmission-/reception units according to the invention, which are arranged at a high pressure rinsing hose, and between which a wireless communication connection may be established.

FIG. 4 shows three repeaters 18" according to the invention, which are arranged in a predetermined distance with respect to each other at a rinsing hose 12a. The structure of the repeater 18" essentially corresponds to the transmission-/reception unit shown in FIG. 3, with the difference that the repeater 18" preferably has at the front end as well as at the rear end, respectively, at least one antenna system 19.

Further, each repeater has its own device 40 for power generation such that for each repeater power may be supplied independently from each other. Advantageously, each repeater has its own accumulator, which may be charged by the generator of the device 40 such that the respective repeaters 18" may also be operated, if no rinsing water is passed through the rinsing hose 12a.

The repeaters 18" may also be configured such that they also may be operated without rinsing hose and rinsing water, respectively. Hereby, the device 40 for power generation may be dispensed with, whereby then, however, an accumulator sufficiently dimensioned or a battery sufficiently dimensioned, respectively, has to be provided. The repeaters 18" configured accordingly may be set out by the pipe inspection system during introduction into a pipe at predetermined locations, and during drawing back out of the pipe inspection system may again be taken up by the latter. Alternatively, the repeaters 18" may also remain in the pipe, where they may fulfill additional tasks, if needed, for example detecting the temperature in cyclic time periods and transmitting it to a control means. For this, it may be advantageous, if also the repeaters 18" are equipped with additional sensors, for example, temperature sensors, pressure sensors or humidity sensors.

It has also been found to be advantageous to use a WLAN connection for the wireless communication connection, because this does not require a special permit for the use in the pipe inspection system. The transmission of the measurement data and video data and the control data, respectively, may be carried out via various transmission protocols and may be encrypted, if needed.

The inspection system according to the invention and the inspection unit, respectively, are specifically suited for the use in explosion protected areas, because the inspection system and the inspection unit, respectively, may be operated completely without electrical or data cables, respectively, which may be damaged during operation.

LIST OF REFERENCE NUMERALS 5 pipe, for example, pipe of a pipe system
10 inspection system, in particular, pipe inspection system and/or pipe cleaning system
11 inspection unit
12 first rinsing hose with electrical connection to the rinsing head and to the camera at the rinsing head, respectively
12a second rinsing hose
12b conduit in the transmission-/reception unit for connecting the first rinsing hose to the second rinsing hose
12c hose couplings at the first rinsing hose, for example, quick-lock couplings
13 rinsing head
13a chamber in the rinsing head
14 rinsing nozzle
18 first transmission-/reception unit (in the inspection unit)
18' second transmission-/reception unit (at the control unit)
18" third transmission-/reception unit (repeater)
18a transmission-/reception module
19 antenna system and transmitting-/receiving antenna of the transmission-/reception unit, respectively
20 image acquisition means (camera head or camera, respectively, for example, video camera)
25 light source, for example, LED
35 measuring element, for example, IR temperature sensor
40 device for power generation
50 control means, for example, data processing means with monitor
55 data cable
F wireless communication connection, for example, WLAN connection
LA longitudinal axis

What is claimed is:

1. An inspection unit for an inspection system for inspecting or cleaning of pipes having a first rinsing hose, whereby
   a front end of the rinsing hose having a rinsing head may be coupled to a number of rinsing nozzles substantially directed backwards, and
   a rear end of the first rinsing hose having a transmission-/reception unit for wireless transmission of control or measurement data is coupled between the inspection unit and a control unit
   whereby an image acquisition means is arranged at the rinsing head, and whereby the first rinsing hose has electrical cables, which:
      connect the image acquisition means to the generator or to the accumulator for power supply of the image acquisition means, and
      connect the image acquisition means to the transmission-/reception module to transmit images from the image acquisition means to the transmission-/reception module or control signals from the transmission-/reception module to the image acquisition means, and
   whereby the electrical cables are integrated into a jacket of the first rinsing hose or are arranged at the jacket surface of the first rinsing hose, whereby the first rinsing hose and the electrical cables are surrounded by an outer jacket, and whereby connection contacts of the electrical cables are provided at the ends of the first rinsing hose, and whereby counter contacts corresponding to the connecting contacts are provided at the rinsing head and at the transmission-/reception unit.

2. The inspection unit of claim 1, whereby the transmission-/reception unit is coupled to a second rinsing hose, whereby a conduit is provided within the transmission-/reception unit, via which the first rinsing hose is coupled to the second rinsing hose, and which has essentially the same diameter as the first and/or the second rinsing hose.

3. The inspection unit of claim 2, whereby a device for transformation of kinetic energy of the rinsing water into electrical energy is arranged in the transmission-/reception unit, whereby the device has at least a water turbine and a generator.

4. The inspection unit of claim 3, whereby an accumulator is arranged within the transmission-/reception unit, which is coupled to the generator.

5. The inspection unit of claim 1, whereby a transmission-/reception module of the transmission-/reception unit is coupled to the generator or to the accumulator for power supply of the transmission-/reception module.

6. The inspection unit of claim 1, whereby the transmission-/reception unit comprises an antenna system with at least one transmitting antenna and at least one receiving antenna, whereby the antennas of the antenna system are directed backwards.

* * * * *